United States Patent
Wang et al.

(10) Patent No.: US 10,341,062 B2
(45) Date of Patent: Jul. 2, 2019

(54) DATA RETRANSMISSION METHOD AND APPARATUS

(71) Applicant: China Mobile Communications Corporation, Beijing (CN)

(72) Inventors: Rui Wang, Beijing (CN); Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/550,249

(22) PCT Filed: Dec. 21, 2015

(86) PCT No.: PCT/CN2015/098096
§ 371 (c)(1),
(2) Date: Aug. 10, 2017

(87) PCT Pub. No.: WO2016/127704
PCT Pub. Date: Aug. 18, 2016

(65) Prior Publication Data
US 2018/0048431 A1      Feb. 15, 2018

(30) Foreign Application Priority Data

Feb. 10, 2015   (CN) .......................... 2015 1 0070005

(51) Int. Cl.
*H04L 1/18* (2006.01)
*H04L 1/08* (2006.01)
(Continued)

(52) U.S. Cl.
CPC .............. *H04L 1/1819* (2013.01); *H04L 1/08* (2013.01); *H04L 1/1822* (2013.01);
(Continued)

(58) Field of Classification Search
CPC ... H04L 1/1822; H04L 1/1812; H04L 1/1843; H04L 1/1864; H04L 1/1887;
(Continued)

(56) References Cited

U.S. PATENT DOCUMENTS 8,694,731 B2 *  4/2014  Tao ........................ H04L 1/0053
                                                              711/133
2009/0279480 A1 * 11/2009 Rosenqvist ........... H04L 1/1887
                                                              370/328

(Continued)

FOREIGN PATENT DOCUMENTS

CN          1731705 A      2/2006
CN          1976271 A      6/2007
(Continued)

OTHER PUBLICATIONS

International Serach Report dated Feb. 29, 2016, issued in International Application No. PCT/CN2015/098096.
(Continued)

*Primary Examiner* — Shelly A Chase
(74) *Attorney, Agent, or Firm* — Mintz Levin Cohn Ferris Glovsky and Popeo, P.C.; Kongsik Kim; Carolina Säve

(57) ABSTRACT

A data retransmission method provided according to an embodiment includes that: retransmitted data transmitted to User Equipment (UE) by a base station on a second carrier is received, the retransmitted data being data failed to be transmitted previously on a first carrier; and the received retransmitted data is merged with initially transmitted data received previously on the first carrier and corresponding to the retransmitted data. The embodiment may ensure timely retransmission after a data transmission failure, reduce a data retransmission delay and also reduce a packet loss phenomenon caused by a relatively long retransmission waiting time. Moreover, the UE may merge the received retransmitted data with the initially transmitted data, so that (Continued)

data transmission continuity is ensured, and network performance is improved.

16 Claims, 11 Drawing Sheets

(51) Int. Cl.
*H04W 72/04* (2009.01)
*H04W 72/12* (2009.01)

(52) U.S. Cl.
CPC .......... *H04L 1/1861* (2013.01); *H04L 1/1864* (2013.01); *H04W 72/042* (2013.01); *H04W 72/1273* (2013.01)

(58) Field of Classification Search
CPC ... H04L 1/1893; H04L 5/0064; H04L 5/0075; H04L 1/1819; H04L 1/08; H04L 1/1861; H04W 72/042; H04W 72/1273
See application file for complete search history.

(56) References Cited

U.S. PATENT DOCUMENTS

| 2011/0194499 A1* | 8/2011 | Aiba | H04L 1/1822 370/328 |
| 2011/0243048 A1 | 10/2011 | Wang | |
| 2012/0113946 A1 | 5/2012 | Seo et al. | |
| 2012/0320853 A1 | 12/2012 | Kwon et al. | |
| 2014/0010067 A1 | 1/2014 | Guan et al. | |

FOREIGN PATENT DOCUMENTS

| CN | 101964704 A | 2/2011 |
| CN | 102651679 A | 8/2012 |
| CN | 103684713 A | 3/2014 |
| EP | 2391046 A2 | 11/2011 |
| EP | 2406910 A1 | 1/2012 |
| WO | 2011008049 A2 | 1/2011 |

OTHER PUBLICATIONS

English Translation of Written Opinion dated Feb. 29, 2016, issued in International Application No. PCT/CN2015/098096.
Kyocera, "R2-150268, HARQ retransmissions on LAA" 3GPP TSG RAN WG2 #89, Jan. 31, 2015, Section 2.
Supplementary European Search Report in corresponding European Patent Application No. 15881852.6, dated Dec. 19, 2017.
ETRI: "Discussion on HARQ operation for LAA", 3GPP Draft; R1-150633—Discussion on HARQ Operation for LAA, 3rd Generation Partnership Project (3GPP), Mobile Competence Centre; 650, Route Des Lucioles; F-06921 Sophia-Antipolis Cedex; France, vol. RAN WG1; No. Athens, Greece; Feb. 9, 2015-Feb. 13, 2015 Feb. 8, 2015.

* cited by examiner

DATA RETRANSMISSION METHOD AND APPARATUS

CROSS-REFERENCE TO RELATED APPLICATIONS

The present application claims benefit of Chinese Application No. 201510070005.6, filed on Feb. 10, 2015, the contents of which are hereby incorporated by reference in its entirety.

TECHNICAL FIELD

The present disclosure relates to the technical field of communications, and in particular to a data retransmission method and apparatus.

BACKGROUND

Along with sharp increase of data traffic in mobile Internet, each operator explores use of a Long Term Evolution (LTE) technology on an unlicensed band, thereby developing a technology named License-Assisted Access (LAA).

An unlicensed band is open for all operators, and different operators have the same right of deploying LTE on the unlicensed band. For enabling different systems or different operators to fairly compete for using the unlicensed band, a Listen Before Talk (LBT) mechanism is introduced into an LAA technology. That is, a period of time is reserved at first to sense a carrier before data transmission of each time. Data transmission is started only when the carrier is sensed to be available. Moreover, there is a maximum time length limit made to data transmission of each time. Thus, it can be seen that the LBT mechanism is introduced into LAA just for avoiding a conflict between different systems or different operators in use of the unlicensed band and may not actually implement coordinated use of the unlicensed band between different systems and different operators.

In an LTE system, a Hybrid Automatic Repeat reQuest (HARQ) mechanism is usually adopted to ensure Quality of Service (QoS). In the LAA, a Carrier Aggregation (CA) architecture is mainly considered to be used. In a related CA architecture, HARQ retransmission and initial transmission are located on the same carrier.

Since an unlicensed band is open for all operators and all wireless access systems and different operators or different systems may not coordinate with each other, it is impossible to ensure that a carrier may be immediately adopted for data retransmission after a failure of data transmission on the carrier of the unlicensed band, which causes a relatively long HARQ delay. If the carrier is still unavailable after a relatively long time, data may finally be dropped, thereby reducing network performance.

Thus, it can be seen that a related HARQ mechanism may cause a relatively long data retransmission delay and even a packet loss phenomenon, thereby reducing network performance.

SUMMARY (1) Technical Problem to be Solved

Embodiments of the present disclosure provide a data retransmission method and apparatus, which are configured to solve the problem of relatively low network performance caused by a relatively long data retransmission delay and even packet loss phenomenon in a conventional art.

(2) Technical Solutions

In order to achieve the purpose, the technical solutions of the present disclosure are implemented as follows.

An embodiment of the present disclosure provides a data retransmission method, which may include that:

retransmitted data transmitted to User Equipment (UE) by a base station on a second carrier is received, the retransmitted data being data failed to be transmitted previously on a first carrier; and the received retransmitted data is merged with initially transmitted data received previously on the first carrier and corresponding to the retransmitted data.

Optionally, the first carrier may be located in an unlicensed band; and the second carrier may be located in the unlicensed band or a licensed band.

Optionally, before the step that the retransmitted data transmitted on the second carrier is received, the method may further include:

Downlink Control Information (DCI) transmitted on the second carrier is received, the DCI being configured to indicate the UE to receive downlink data transmitted on the second carrier and merge the received downlink data with the initially transmitted data corresponding to the retransmitted data as the retransmitted data.

Optionally, the DCI may include:

first information indicating the first carrier on which the initially transmitted data is transmitted; and/or second information indicating a process number corresponding to the initially transmitted data.

Optionally, the first information may include a Carrier Instructions Field (CIF) indicating the first carrier and a 1 bit flag configured to indicate that the carrier indicated by the CIF is the carrier on which the initially transmitted data is transmitted.

Optionally, before the step that the retransmitted data transmitted on the second carrier is received, the method may further include:

after it is determined that the data is failed to be received on the first carrier, the second carrier for data retransmission and a process number corresponding to the retransmitted data are determined according to a retransmission carrier selection principle and a process number selection principle; and when the downlink data is required to be received, if it is determined that a carrier on which the downlink data is transmitted is the second carrier determined previously for data retransmission and a process number corresponding to the downlink data is the process number determined previously and corresponding to the retransmitted data, it is determined that the downlink data required to be received is the retransmitted data.

Optionally, the retransmission carrier selection principle may include that: a carrier with a minimum load and a best channel condition is selected from carriers participating in CA as the second carrier.

Optionally, the process number selection principle may include that:

a value obtained by a modulo operation of the process number corresponding to the initially transmitted data over a number of processes carried by the second carrier is determined;

if the value obtained by the modulo operation is not 0, the process number corresponding to the retransmitted data is selected to be the value obtained by the modulo operation; and if the value obtained by the modulo operation is 0, the process number corresponding to the retransmitted data is selected to be a value of the number of the processes carried by the second carrier, or, the process number corresponding to the retransmitted data is selected to be a preset process number.

Optionally, when the second carrier is a Frequency Division Duplexing (FDD) carrier, the number of the processes carried by the second carrier may be 8; and when the second carrier is a Time Division Duplexing (TDD) carrier, the number of the processes carried by the second carrier may be a number of processes carried by the second carrier under a current uplink and downlink sub-frame proportion.

Another embodiment of the present disclosure provides a data retransmission method, which may include:

when data is failed to be transmitted to UE on a first carrier, if it is determined that the first carrier may not be continued to be used for data retransmission, a second carrier for data retransmission is configured for the UE; and the data failed to be transmitted previously on the first carrier is retransmitted to the UE on the configured second carrier.

An embodiment of the present disclosure provides a data retransmission apparatus, which may include:

a receiving module, configured to receive retransmitted data transmitted to UE by a base station on a second carrier, the retransmitted data being data failed to be transmitted previously on a first carrier; and a merging module, configured to merge the received retransmitted data and initially transmitted data received previously on the first carrier and corresponding to the retransmitted data.

Another embodiment of the present disclosure provides a data retransmission apparatus, which may include:

a configuration module, configured to, when data is failed to be transmitted to UE on a first carrier, if it is determined that the first carrier may not be continued to be used for data retransmission, configure a second carrier for data retransmission for the UE; and a transmission module, configured to retransmit the data failed to be transmitted previously on the first carrier to the UE on the configured second carrier configured by the configuration module.

(3) Beneficial Effects

The embodiments of the present disclosure at least have the following beneficial effects.

In the embodiments of the present disclosure, when the data is failed to be transmitted to the UE on the first carrier, the second carrier for data retransmission may be configured for the UE, the data failed to be transmitted previously on the first carrier is retransmitted to the UE on the second carrier, and after receiving the retransmitted data, the UE merges the received retransmitted data with the initially transmitted data received previously on the first carrier and corresponding to the retransmitted data. Thus, it can be seen that the embodiments of the present disclosure may ensure timely retransmission after a data transmission failure, reduce a data retransmission delay and also reduce a packet loss phenomenon caused by a relatively long retransmission waiting time. Moreover, the UE may merge the received retransmitted data with the initially transmitted data, so that data transmission continuity is ensured, and network performance is improved.

BRIEF DESCRIPTION OF DRAWINGS

In order to more clearly describe the technical solutions in the embodiments of the present disclosure or the conventional art, the drawings required to be used for descriptions about the embodiments or the conventional art will be simply introduced below. Clearly, the drawings described below are only some embodiments of the present disclosure. Those skilled in the art may also obtain other drawings according to these drawings without creative work.

DETAILED DESCRIPTION

Figure 1:
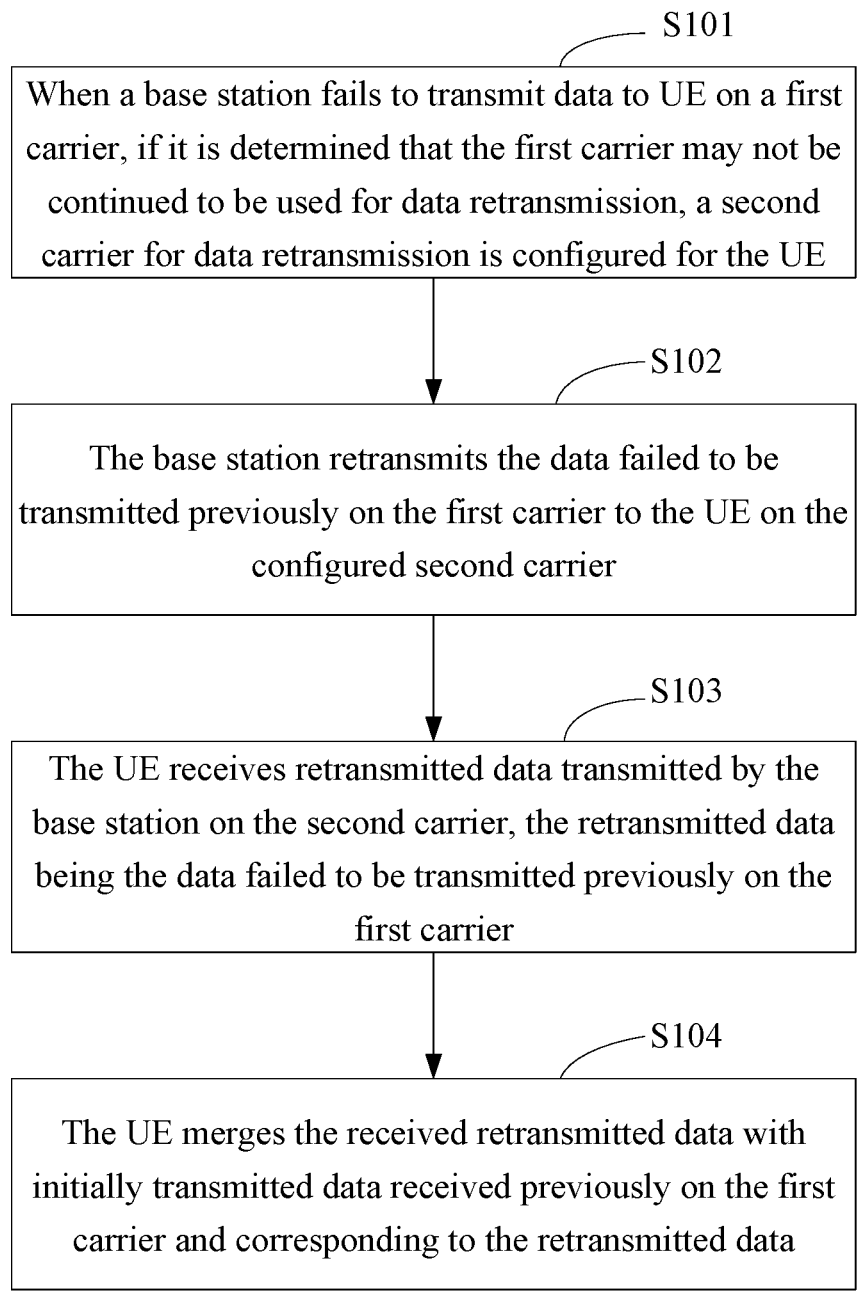
FIG. 1 is a flowchart of a data retransmission method according to embodiment 1 of the present disclosure.

Embodiments of the present disclosure will be further described below with reference to the drawings and embodiments. The following embodiments are intended only to describe the present disclosure but not to limit the scope of the present disclosure.

In order to make the purpose, technical solutions and advantages of the embodiments of the present disclosure clearer, the technical solutions of the embodiments of the present disclosure will be clearly and completely described below with reference to the drawings of the embodiments of the present disclosure. Clearly, the described embodiments are not all embodiments but only a part of embodiments of the present disclosure. All other embodiments obtained by those skilled in the art on the basis of the described embodiments of the present disclosure shall fall within the scope of protection of the present disclosure.

Unless otherwise defined, technical terms or scientific terms used herein shall have ordinary meanings understood by those skilled in the field of the present disclosure. "First", "second" and similar words used in the specification and claims of the present disclosure are intended not to represent any sequence, number or importance but only to distinguish different components. Similarly, similar words such as "a" or "one" are also intended not to represent a number limit but to represent existence of at least one. Similar words such as "connect" or "mutually connect" are not limited to physical or mechanical connection, but may include electrical connection, either directly or indirectly. "Upper", "lower", "left", "right" and the like are only adopted to represent a relative positional relationship, and after an absolute position of a described object is changed, the relative positional relationship is also correspondingly changed.

The principle and characteristics of the embodiments of the present disclosure will be described below with reference to the drawings. Listed examples are only adopted to explain the embodiments of the present disclosure and not intended to limit the scope of the embodiments of the present disclosure.

A basic thought of the embodiments of the present disclosure is that: when data is failed to be transmitted to UE on a first carrier, a second carrier for data retransmission may be configured for the UE, the data failed to be transmitted previously on the first carrier is retransmitted to the UE on the second carrier, and after receiving the retransmitted data, the UE merges the received retransmitted data with the initially transmitted data received previously on the first carrier and corresponding to the retransmitted data. Thus, it can be seen that the embodiments of the present disclosure may ensure timely retransmission after a data transmission failure, reduce a data retransmission delay and also reduce a packet loss phenomenon caused by a relatively long retransmission waiting time. Moreover, the UE may merge the received retransmitted data with the initially transmitted data, so that data transmission continuity is ensured, and network performance is improved.

The embodiments of the present disclosure further provide a solution that the UE merges the retransmitted data with the initially transmitted data received previously after receiving the retransmitted data, thereby ensuring the data transmission continuity.

The embodiments of the present disclosure will be further described below in detail with reference to the drawings of the specification.

Embodiment 1

FIG. 1 is a flowchart of a data retransmission method according to embodiment 1 of the present disclosure. The method includes the following steps.

At S101, when a base station fails to transmit data to UE on a first carrier, if it is determined that the first carrier may not be continued to be used for data retransmission, a second carrier for data retransmission is configured for the UE.

During specific implementation, after the base station fails to transmit the data to the UE on the first carrier, the UE may feedback Negative Acknowledgement (NACK) information to the base station. The base station judges whether the first carrier may be configured for data retransmission or not at this moment. If the first carrier may not be configured for data retransmission, the base station configures another carrier for the UE.

Optionally, the first carrier is located in an unlicensed band and the second carrier is located in the unlicensed band or a licensed band.

Herein, the embodiment of the present disclosure is mainly for a condition of failed carrier data transmission on the unlicensed band, and of course, is also applicable to a condition of failed carrier data transmission on the licensed band.

Optionally, the operation that the second carrier for data retransmission is configured for the UE includes that:

if a carrier, configurable for data retransmission, in the unlicensed band is found within a preset time length or the number of traversing times, the found carrier in the unlicensed band is determined as the second carrier, otherwise a carrier in the licensed band is determined as the second carrier.

During specific implementation, in order to avoid influence on data transmission on the carrier in the licensed band, the carrier in the unlicensed band may be preferably selected for data retransmission. Specifically, a timer (a time is the preset time length) or a counter (a count value is the preset number of traversing times) may be set, and when a time for which an available carrier is searched reaches the time of the timer or a current number of traversing times reaches the count value of the counter, it is not to search for the carrier in the unlicensed band any more, and the carrier in the licensed band is adopted as the carrier for data retransmission. Herein, the number of traversing times refers to that searching states of all carriers participating in CA in the unlicensed band once is considered as one traversing.

At S102, the base station retransmits the data failed to be transmitted previously on the first carrier to the UE on the configured second carrier.

At S103, the UE receives retransmitted data transmitted by the base station on the second carrier, the retransmitted data being the data failed to be transmitted previously on the first carrier.

At S104, the UE merges the received retransmitted data with initially transmitted data received previously on the first carrier and corresponding to the retransmitted data.

During specific implementation, after failing to receive the data, the UE stores the received initially transmitted data at first, and merges the retransmitted data with the initially transmitted data after receiving the subsequent retransmitted data.

During practical implementation, the UE is required to know whether received downlink data is the retransmitted data or not, as well as a specific carrier on which the initially transmitted data corresponding to the retransmitted data is transmitted and a process number corresponding to the initially transmitted data if it is the retransmitted data. On the basis of the information, the UE may merge the received retransmitted data with the initially transmitted data to ensure data continuity.

During specific implementation, the information such as the carrier on which the initially transmitted data is located and the corresponding process number may be indicated in Downlink Control Information (DCI) carried by a Physical Downlink Control Channel (PDCCH), and a retransmission carrier selection principle and a process number selection principle may also be predefined to enable the UE to automatically match the retransmitted data and the initially transmitted data. Specific descriptions will be made below.

A first manner: the base station indicates the carrier on which the initially transmitted data is transmitted and/or the process number corresponding to the initially transmitted data by means of the DCI.

Specifically, after S101 and before S102, the method further includes that: the DCI is transmitted to the UE on the second carrier, the DCI being configured to indicate the UE to receive downlink data transmitted on the second carrier and merge the received downlink data as the retransmitted data with the initially transmitted data corresponding to the retransmitted data.

Herein, the DCI may include first information indicating the first carrier on which the initially transmitted data is transmitted; and/or second information indicating the process number corresponding to the initially transmitted data.

Optionally, the first information includes a CIF indicating the first carrier and a 1 bit flag configured to indicate that the carrier indicated by the CIF is the carrier on which the initially transmitted data is transmitted.

For the first information, during specific implementation, the 1 bit flag configured to indicate attribute information of the CIF in the DCI may be added in the DCI. For example, if a value of the flag is 1, it may be indicated that the carrier indicated by the CIF is a carrier to transmit the downlink data (a meaning of the CIF does not change, still for cross-carrier scheduling in an existing CA architecture). If the value of the flag is 0, it may be indicated that the carrier indicated by the CIF is the carrier on which the initially transmitted data is transmitted (the meaning of the CIF changes for a CA architecture in LAA). Here, the initially transmitted data is data transmitted previously and followed by the retransmitted data transmitted on the second carrier.

For the second information, during specific implementation, a flag indicating the process number may be added in the DCI (if the carrier indicated by the CIF is a Frequency Division Duplexing (FDD) carrier, a 3 bits flag is added; and if the carrier indicated by the CIF is a Time Division Duplexing (TDD) carrier, a 4 bits flag is added). Original information of the DCI includes a flag indicating the process number, an additional flag is added here, and the original flag and the newly added flag may be configured to indicate the process number corresponding to the initially transmitted data and a process number corresponding to the retransmitted data respectively, or are configured to indicate the process number corresponding to the retransmitted data and the process number corresponding to the initially transmitted data respectively.

After the carrier and process number corresponding to the initially transmitted data are acquired, the UE may merge the received retransmitted data and the stored initially transmitted data corresponding to the carrier and the process number. Here, it may be predefined that the retransmitted data and the initially transmitted data have the same Redundancy Version (RV).

In the first manner, the DCI may include the first information, and may also include the second information. Of course, the DCI may also include the first information only. In this case, it is determined that the process number of the initially transmitted data is the same as the process number of the retransmitted data indicated in the CIF as a default.

It is important to note herein that, in the first manner, the base station is required to notify on the first carrier the UE of detecting the DCI transmitted by the PDCCH on the second carrier before transmitting the DCI to the UE on the second carrier or the UE is required to perform blind detection on DCI transmitted by the PDCCH on each carrier in all the carriers participating in CA. A manner for notifying on the first carrier the UE of detecting the DCI transmitted by the PDCCH on the second carrier may specifically be as follows. The base station indicates the UE to detect the DCI transmitted by the PDCCH on the second carrier in the DCI transmitted by the PDCCH on the first carrier.

A second manner: the UE matches the retransmitted data and the initially transmitted data according to the retransmission carrier selection principle and the process number selection principle.

Specifically, before S103, the method further includes that:

after it is determined that the data is failed to be received on the first carrier, the second carrier for data retransmission and the process number corresponding to the retransmitted data are determined according to the retransmission carrier selection principle and the process number selection principle; and when the downlink data is required to be received, if it is determined that a carrier on which the downlink data is transmitted is the second carrier determined previously for data retransmission and a process number corresponding to the downlink data is the process number corresponding to the retransmitted data determined previously, it is determined that the downlink data required to be received is the retransmitted data.

Herein, there may be many retransmission carrier selection principles. For example, a first carrier, except the first carrier, in a carrier list sent by the base station may be selected as the second carrier. Preferably, a carrier with a minimum load and a best channel condition is selected from the carriers participating in CA as the second carrier.

Herein, there may be many process number selection principles. For example, the principle may be as follows. When the process number corresponding to the initially transmitted data is less than or equal to a number of processes which may be carried by the second carrier, the process number corresponding to the retransmitted data is selected to be the same as the process number corresponding to the initially transmitted data. When the process number corresponding to the initially transmitted data is more than the number of the processes carried by the second carrier, the process number corresponding to the retransmitted data is selected to be a preset process number (the preset process number is a value between 1 and a value of the number of the processes carried by the second carrier). For another example, the principle may be as follows. When the process number corresponding to the initially transmitted data is less than or equal to the number of the processes carried by the second carrier, the process number corresponding to the retransmitted data is selected to be the same as the process number corresponding to the initially transmitted data. When the process number corresponding to the initially transmitted data is more than the number of the processes carried by the second carrier, the process number corresponding to the retransmitted data is selected to be a value obtained by rounding-up or rounding down after the process number corresponding to the initially transmitted data is divided by $2^n$ or rooted by nth power, wherein n is a minimum value which makes the process number corresponding to the retransmitted data less than or equal to the number of the processes carried by the second carrier.

Preferably, the process number selection principle may include that:

a value obtained by a modulo operation of the process number corresponding to the initially transmitted data over the number of the processes carried by the second carrier is determined;

if the value obtained by the modulo operation is not 0, the process number corresponding to the retransmitted data is selected to be the value obtained by the modulo operation; and if the value obtained by the modulo operation is 0, the process number corresponding to the retransmitted data is selected to be a value of the number of the processes carried by the second carrier, or, the process number corresponding to the retransmitted data is selected to be a preset process number. Herein, the preset process number is a value between 1 and the value of the number of the processes carried by the second carrier.

Herein, when the second carrier is an FDD carrier, the number of the processes carried by the second carrier is 8; and when the second carrier is a TDD carrier, the number of the processes carried by the second carrier is a number of processes carried by the second carrier under a current uplink and downlink sub-frame proportion.

Table 1 shows the number of processes carried by a carrier under different TDD uplink and downlink sub-frame proportions.

On the basis of the preferred process number selection principle, when the first carrier is an FDD carrier and the second carrier is a TDD carrier, if the current uplink and downlink sub-frame proportion of the second carrier is a configuration Number 0 in the table (corresponding to a number of processes 4), the process number corresponding to the retransmitted data is 1 when the process number corresponding to the initially transmitted data is 5, and the process number corresponding to the retransmitted data is 4 when the process number corresponding to the initially transmitted data is 8.

When the first carrier is a TDD carrier and the second carrier is an FDD carrier (corresponding to a number of processes 8), the process number corresponding to the retransmitted data is 5 when the process number corresponding to the initially transmitted data is 5, and the process number corresponding to the retransmitted data is 2 when the process number corresponding to the initially transmitted data is 10.

When the first carrier is a TDD carrier and the second carrier is a TDD carrier, if the current uplink and downlink sub-frame proportion of the second carrier is a configuration Number 2 in the table (corresponding to a number of processes 10), the process number corresponding to the retransmitted data is 8 when the process number corresponding to the initially transmitted data is 8, and the process number corresponding to the retransmitted data is 4 when the process number corresponding to the initially transmitted data is 14.

TABLE 1

|  | Configuration number | Number of processes |
|---|---|---|
| 5 ms period | 0 | 4 |
|  | 1 | 7 |
|  | 2 | 10 |
| 10 ms period | 3 | 9 |
|  | 4 | 12 |
|  | 5 | 15 |
|  | 6 | 6 |

The thought of the embodiments of the present disclosure will be further described below through some specific embodiments.

Embodiment 2

Figure 2A:
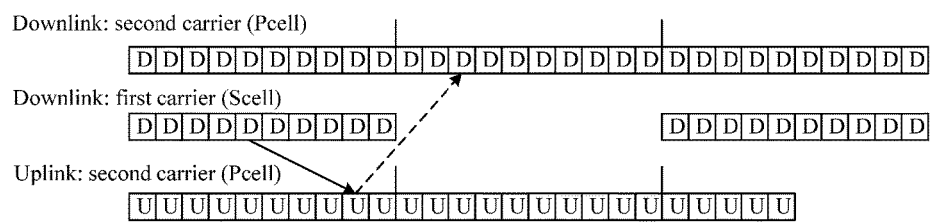
FIG. 2(a) is a schematic diagram of an application scenario according to embodiment 2 of the present disclosure.

Application scenario: initial transmission is located on a first carrier (for example, corresponding to a certain Secondary Cell (Scell)) in an unlicensed band, and retransmission is located on a second carrier (for example, corresponding to a Primary Cell (Pcell)) in a licensed band. FIG. 2(a) is a schematic diagram of the application scenario, and in the figure, D represents a downlink sub-frame and U represents an uplink sub-frame.

Figure 2B:
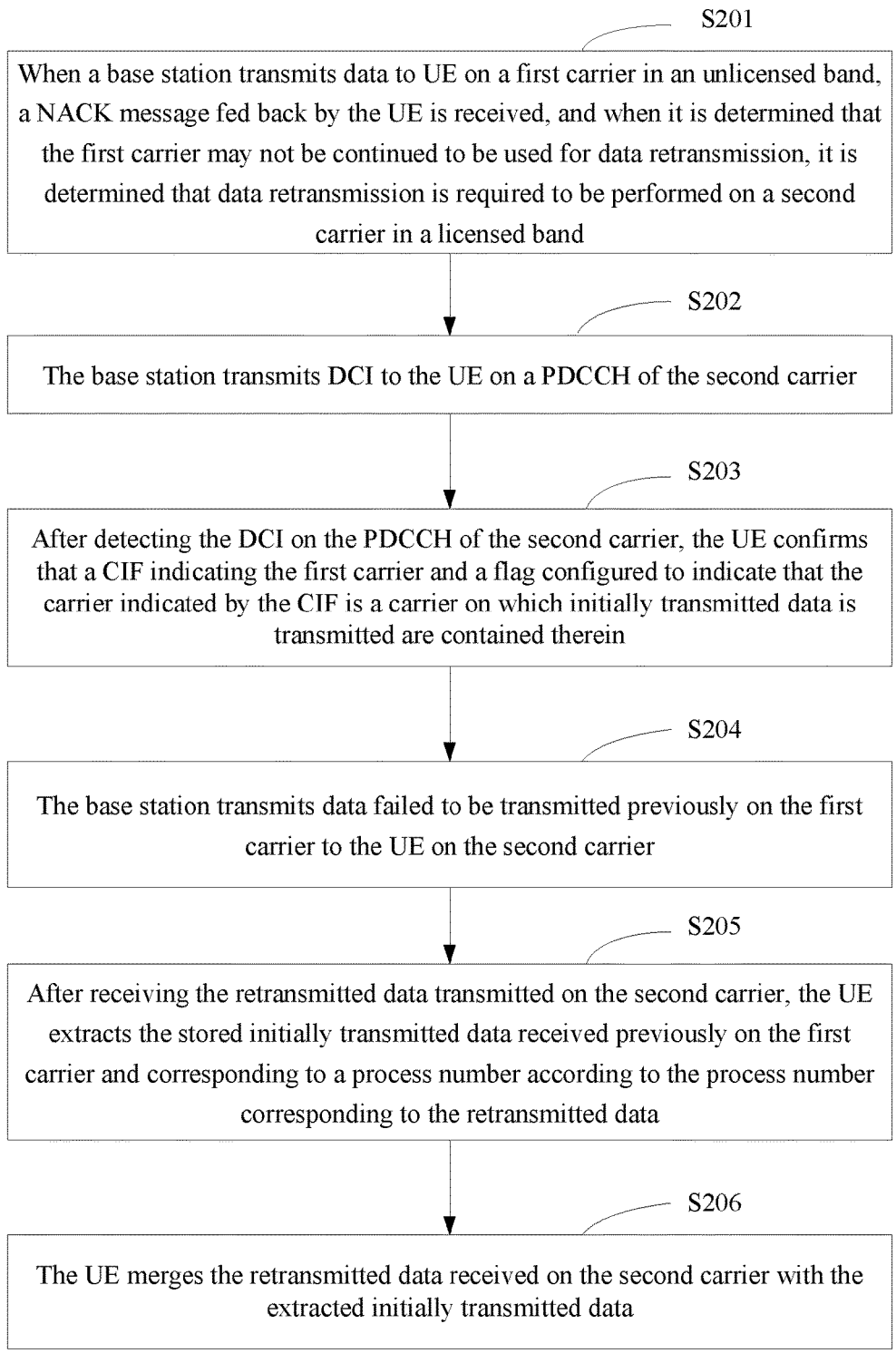
FIG. 2(b) is a flowchart of a data retransmission method according to embodiment 2 of the present disclosure.

A specific implementation process, shown in FIG. 2(b), includes the following steps.

At S201, when a base station transmits data to UE on the first carrier in the unlicensed band, a NACK message fed back by the UE is received, and when it is determined that the first carrier may not be continued to be used for data retransmission, it is determined that data retransmission is required to be performed on the second carrier in the licensed band.

At S202, the base station transmits DCI to the UE on a PDCCH of the second carrier.

At S203, after detecting the DCI on the PDCCH of the second carrier, the UE confirms that a CIF indicating the first carrier and a flag configured to indicate that the carrier indicated by the CIF is a carrier on which initially transmitted data is transmitted are contained therein.

At S204, the base station transmits data failed to be transmitted previously on the first carrier to the UE on the second carrier.

At S205, after receiving the retransmitted data transmitted on the second carrier, the UE extracts the stored initially transmitted data received previously on the first carrier and corresponding to a process number corresponding to the retransmitted data according to the process number.

At S206, the UE merges the retransmitted data received on the second carrier with the extracted initially transmitted data.

Embodiment 3

Figure 3A:
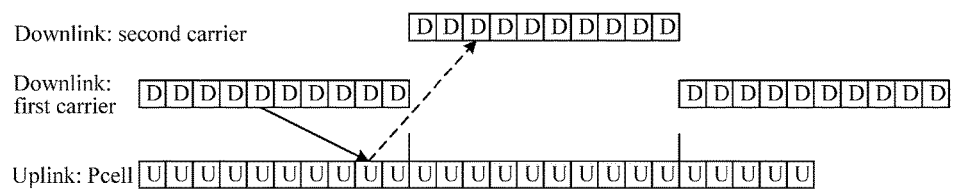
FIG. 3(a) is a schematic diagram of an application scenario according to embodiment 3 of the present disclosure.

Application scenario: initial transmission is located on a first carrier (for example, corresponding to a certain Scell) in an unlicensed band, and retransmission is located on a second carrier (for example, corresponding to another Scell) in the unlicensed band. FIG. 3(a) is a schematic diagram of the application scenario.

Figure 3B:
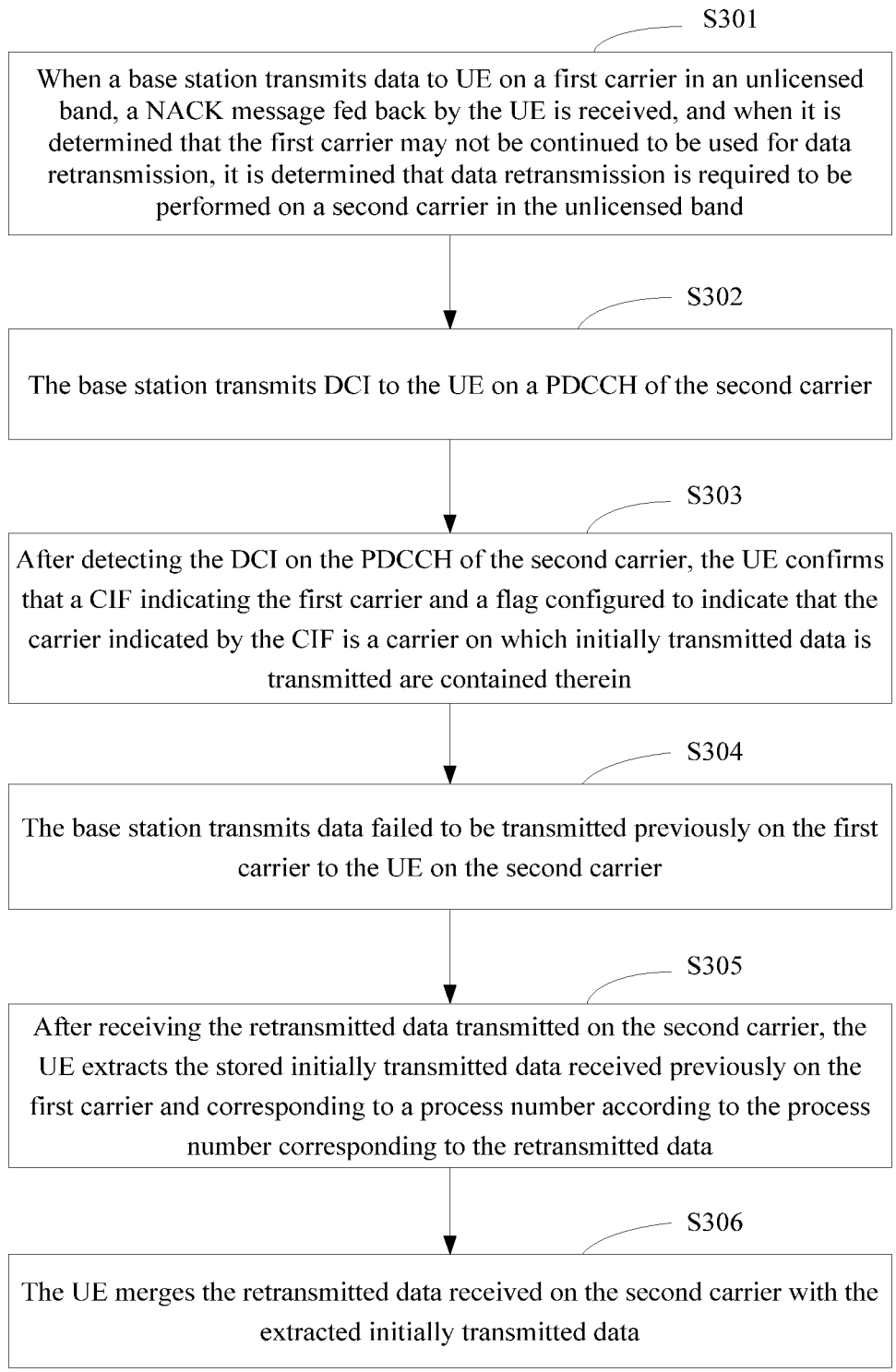
FIG. 3(b) is a flowchart of a data retransmission method according to embodiment 3 of the present disclosure.

A specific implementation process, shown in FIG. 3(b), includes the following steps.

At S301, when a base station transmits data to UE on the first carrier in the unlicensed band, a NACK message fed back by the UE is received, and when it is determined that the first carrier may not be continued to be used for data retransmission, it is determined that data retransmission is required to be performed on the second carrier in the unlicensed band.

At S302, the base station transmits DCI to the UE on a PDCCH of the second carrier.

At S303, after detecting the DCI on the PDCCH of the second carrier, the UE confirms that a CIF indicating the first carrier and a flag configured to indicate that the carrier indicated by the CIF is a carrier on which initially transmitted data is transmitted are contained therein.

At S304, the base station transmits data failed to be transmitted previously on the first carrier to the UE on the second carrier.

At S305, after receiving the retransmitted data transmitted on the second carrier, the UE extracts the stored initially transmitted data received previously on the first carrier and corresponding to a process number corresponding to the retransmitted data according to the process number.

At S306, the UE merges the retransmitted data received on the second carrier with the extracted initially transmitted data.

Embodiment 4

Figure 4:
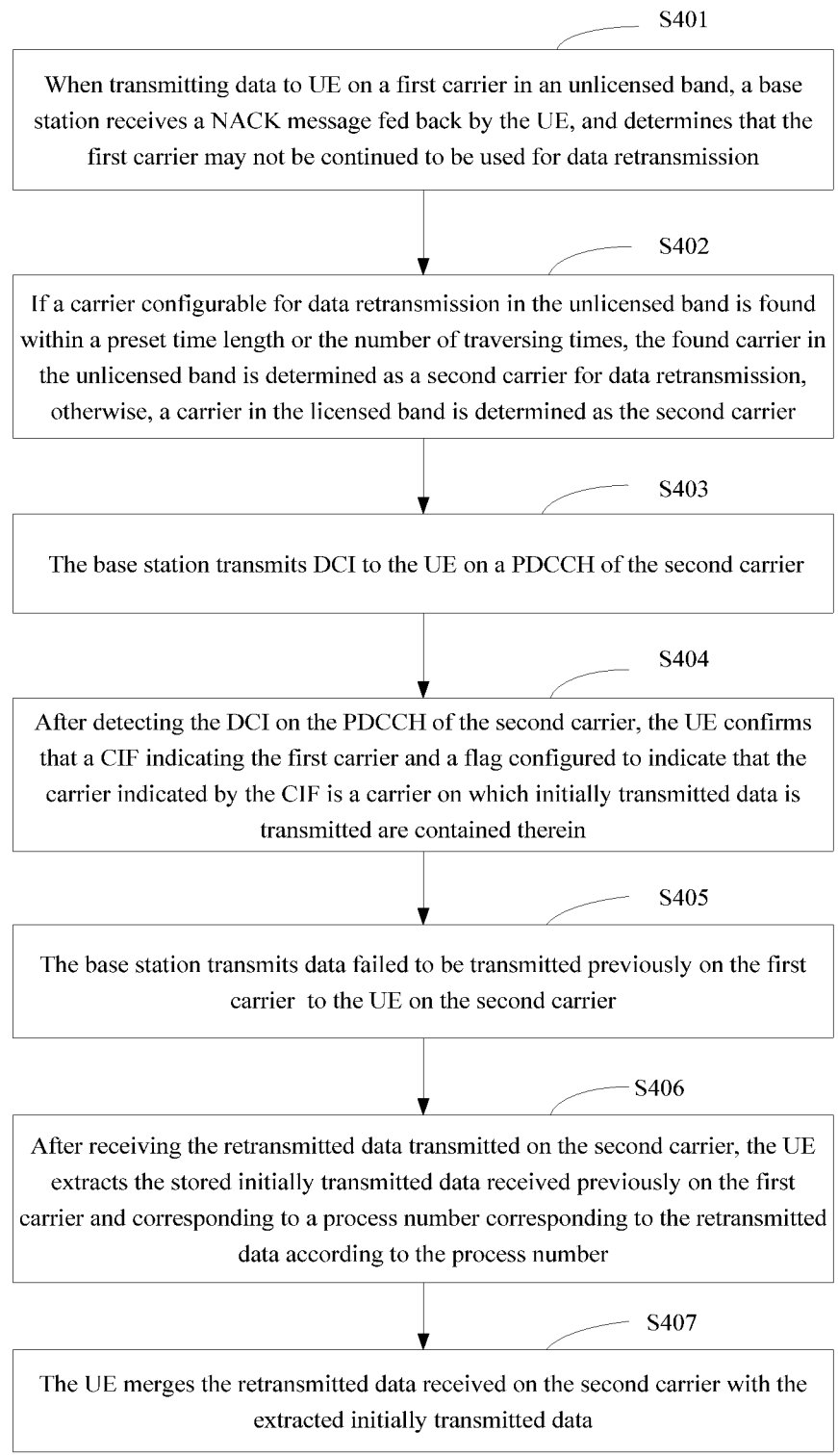
FIG. 4 is a flowchart of a data retransmission method according to embodiment 4 of the present disclosure.

Application scenario: initial transmission is located on a first carrier in an unlicensed band, a carrier in the unlicensed band is considered at first for retransmission, and if a proper carrier in the unlicensed band may not be found within a constraint condition, a carrier in a licensed band is searched. A specific implementation process, shown in FIG. 4, includes the following steps.

At S401, when transmitting data to UE on the first carrier in the unlicensed band, a base station receives a NACK message fed back by the UE, and determines that the first carrier may not be continued to be used for data retransmission.

At S402, if a carrier configurable for data retransmission in the unlicensed band is found within a preset time length or number of traversing times, the found carrier in the unlicensed band is determined as a second carrier for data retransmission, otherwise, a carrier in the licensed band is determined as the second carrier.

At S403, the base station transmits DCI to the UE on a PDCCH of the second carrier.

At S404, after detecting the DCI on the PDCCH of the second carrier, the UE confirms that a CIF indicating the first carrier and a flag configured to indicate that the carrier indicated by the CIF is a carrier on which initially transmitted data is transmitted are contained therein.

At S405, the base station transmits data failed to be transmitted previously on the first carrier to the UE on the second carrier.

At S406, after receiving the retransmitted data transmitted on the second carrier, the UE extracts the stored initially transmitted data received previously on the first carrier and corresponding to a process number corresponding to the retransmitted data according to the process number.

At S407, the UE merges the retransmitted data received on the second carrier with the extracted initially transmitted data.

Embodiment 5

The application scenario is the same as embodiment 2, initial transmission is located on a first carrier (for example, corresponding to a certain Scell) in an unlicensed band, and retransmission is located on a second carrier (for example, corresponding to a Pcell) in a licensed band. In the embodiment, DCI not only contains first information indicating a carrier on which initially transmitted data is transmitted, but also contains second information indicating a process number of the initially transmitted data.

Figure 5:
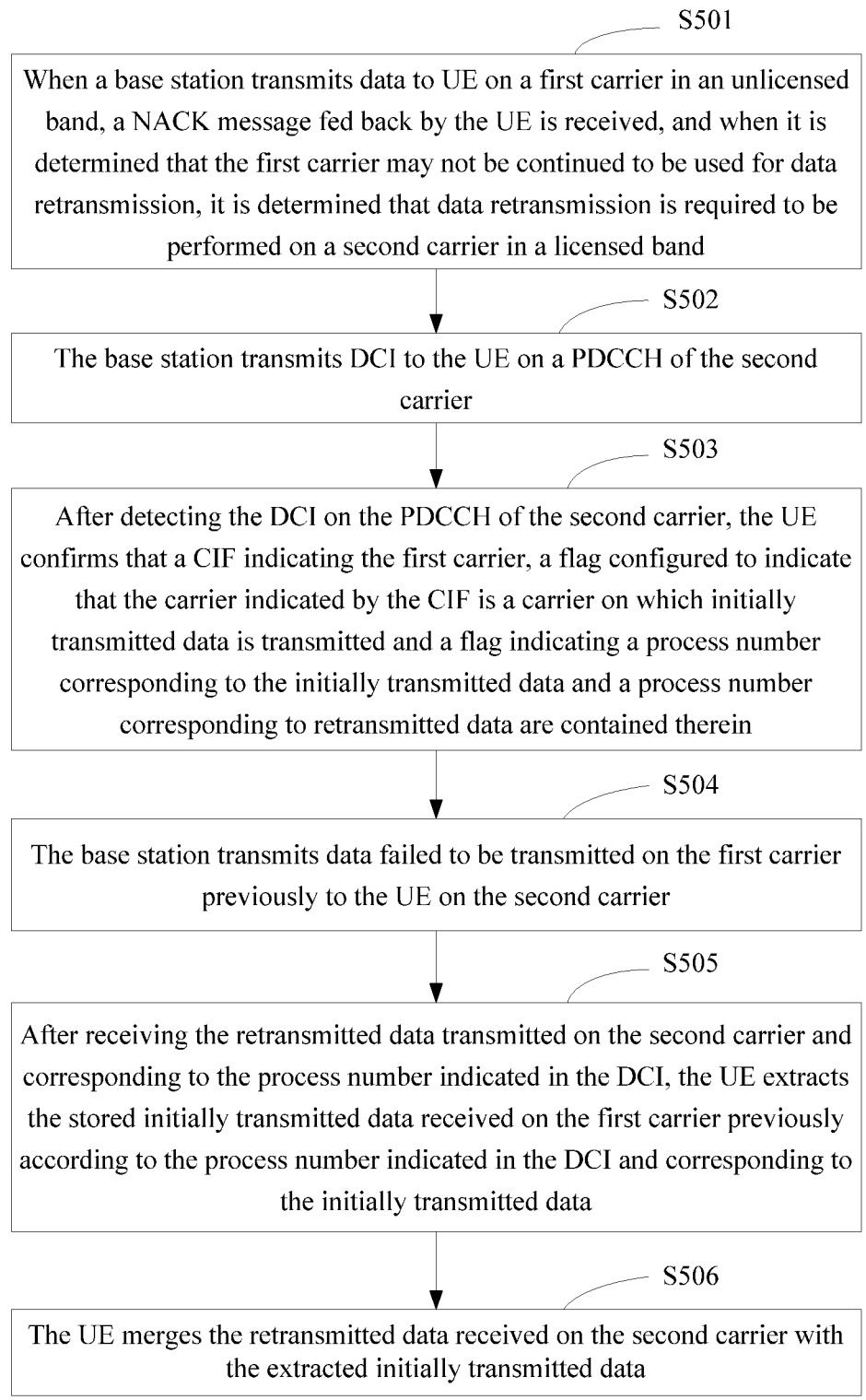
FIG. 5 is a flowchart of a data retransmission method according to embodiment 5 of the present disclosure.

A specific implementation process, shown in FIG. 5, includes the following steps.

At S501, when a base station transmits data to UE on the first carrier in the unlicensed band, a NACK message fed back by the UE is received, and when it is determined that the first carrier may not be continued to be used for data retransmission, it is determined that data retransmission is required to be performed on the second carrier in the licensed band.

At S502, the base station transmits the DCI to the UE on a PDCCH of the second carrier.

At S503, after detecting the DCI on the PDCCH of the second carrier, the UE confirms that a CIF indicating the first carrier, a flag configured to indicate that the carrier indicated by the CIF is the carrier on which the initially transmitted data is transmitted and a flag indicating the process number corresponding to the initially transmitted data and a process number corresponding to retransmitted data are contained therein.

At S504, the base station transmits data failed to be transmitted previously on the first carrier to the UE on the second carrier.

At S505, after receiving the retransmitted data transmitted on the second carrier and corresponding to the process number indicated in the DCI, the UE extracts the stored initially transmitted data received previously on the first carrier according to the process number indicated in the DCI and corresponding to the initially transmitted data.

At S506, the UE merges the retransmitted data received on the second carrier with the extracted initially transmitted data.

Embodiment 6

The application scenario is the same as embodiment 3, initial transmission is located on a first carrier (for example, corresponding to a certain Scell) in an unlicensed band, and retransmission is located on a second carrier (for example, corresponding to another Scell) in the unlicensed band. In the embodiment, DCI not only contains first information indicating a carrier on which initially transmitted data is transmitted, but also contains second information indicating a process number of the initially transmitted data.

Figure 6:
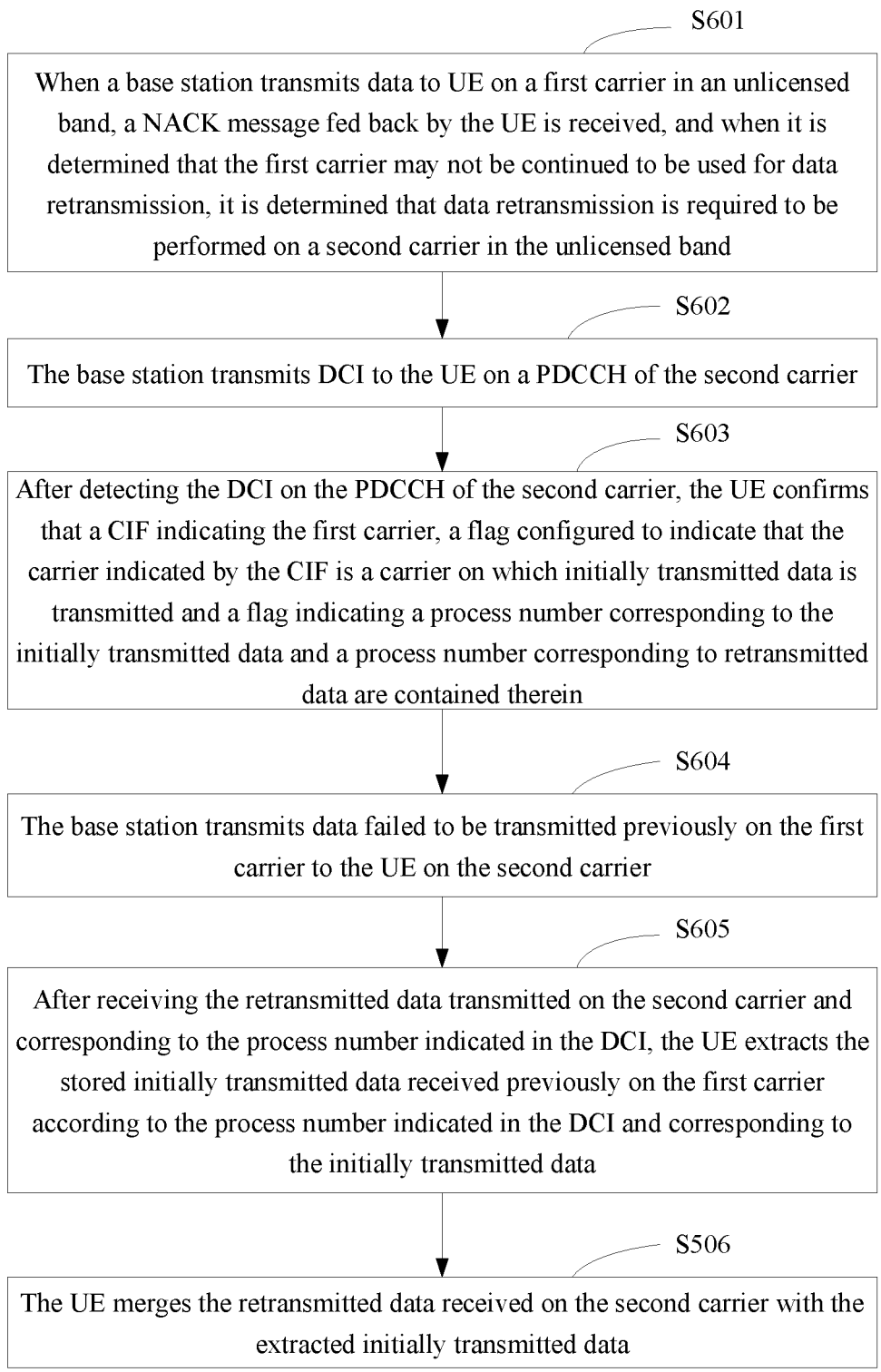
FIG. 6 is a flowchart of a data retransmission method according to embodiment 6 of the present disclosure.

A specific implementation process, shown in FIG. 6, includes the following steps.

At S601, when a base station transmits data to UE on the first carrier in the unlicensed band, a NACK message fed back by the UE is received, and when it is determined that the first carrier may not be continued to be used for data retransmission, it is determined that data retransmission is required to be performed on the second carrier in the unlicensed band.

At S602, the base station transmits the DCI to the UE on a PDCCH of the second carrier.

At S603, after detecting the DCI on the PDCCH of the second carrier, the UE confirms that a CIF indicating the first carrier, a flag configured to indicate that the carrier indicated by the CIF is the carrier on which the initially transmitted data is transmitted and a flag indicating the process number corresponding to the initially transmitted data and a process number corresponding to retransmitted data are contained therein.

At S604, the base station transmits data failed to be transmitted previously on the first carrier to the UE on the second carrier.

At S605, after receiving the retransmitted data transmitted on the second carrier and corresponding to the process number indicated in the DCI, the UE extracts the stored initially transmitted data received on the first carrier previously according to the process number indicated in the DCI and corresponding to the initially transmitted data.

At S606, the UE merges the retransmitted data received on the second carrier with the extracted initially transmitted data.

Embodiment 7

The application scenario is the same as embodiment 4, initial transmission is located on a first carrier in an unlicensed band, a carrier in the unlicensed band is considered at first for retransmission, and if a proper carrier in the unlicensed band may not be found within a constraint condition, a carrier in a licensed band is searched. In the embodiment, DCI not only contains first information indicating a carrier on which initially transmitted data is transmitted, but also contains second information indicating a process number of the initially transmitted data.

Figure 7:
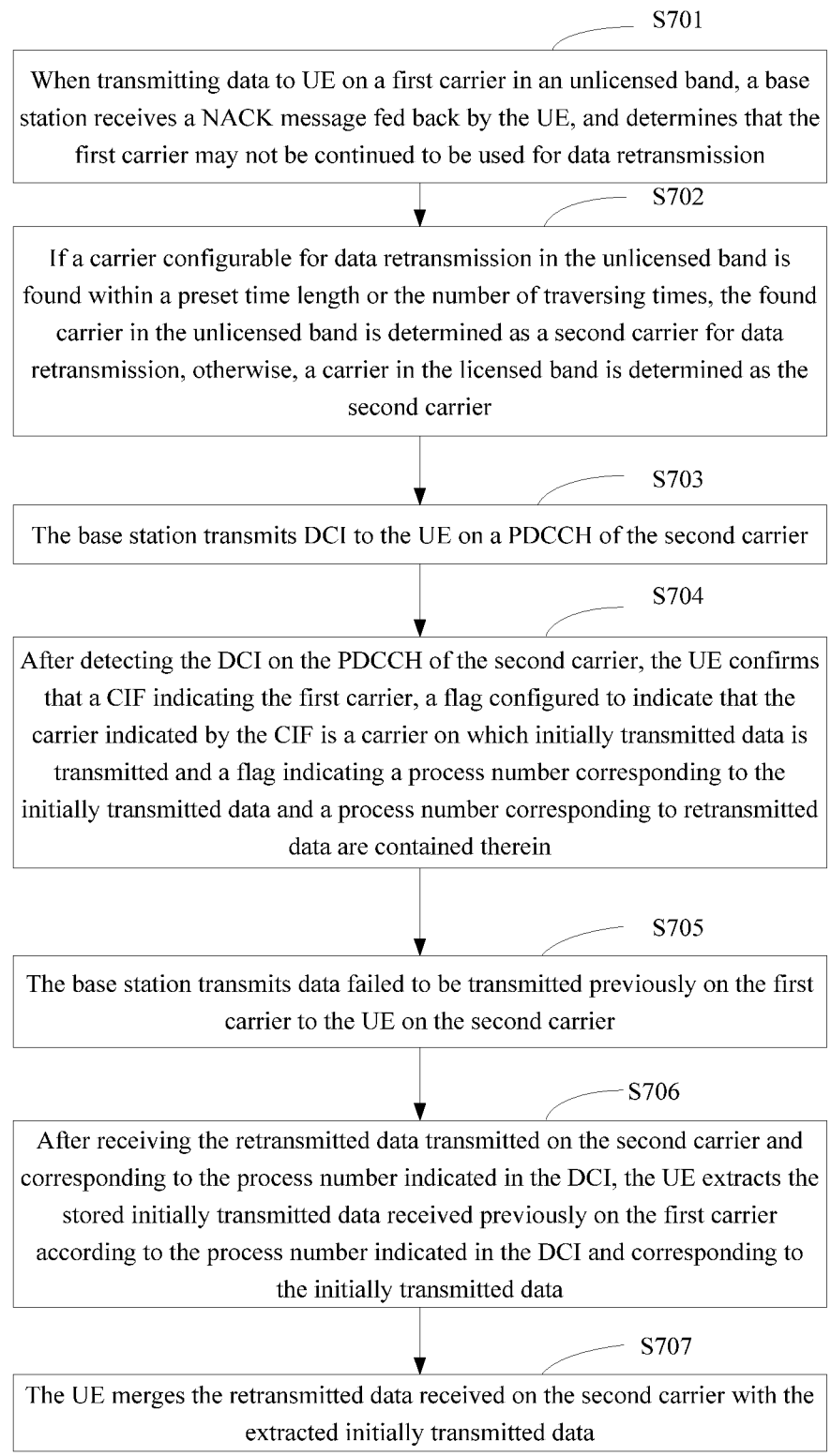
FIG. 7 is a flowchart of a data retransmission method according to embodiment 7 of the present disclosure.

A specific implementation process, shown in FIG. 7, includes the following steps.

At S701, when transmitting data to UE on the first carrier in the unlicensed band, a base station receives a NACK message fed back by the UE, and determines that the first carrier may not be continued to be used for data retransmission.

At S702, if a carrier configurable for data retransmission in the unlicensed band is found within a preset time length or the number of traversing times, the found carrier in the unlicensed band is determined as a second carrier for data retransmission, otherwise, a carrier in the licensed band is determined as the second carrier.

At S703, the base station transmits DCI to the UE on a PDCCH of the second carrier.

At S704, after detecting the DCI on the PDCCH of the second carrier, the UE confirms that a CIF indicating the first carrier, a flag configured to indicate that the carrier indicated by the CIF is the carrier on which the initially transmitted data is transmitted and a flag indicating the process number corresponding to the initially transmitted data and a process number corresponding to retransmitted data are contained therein.

At S705, the base station transmits data failed to be transmitted previously on the first carrier to the UE on the second carrier.

At S706, after receiving the retransmitted data transmitted on the second carrier and corresponding to the process number indicated in the DCI, the UE extracts the stored initially transmitted data received previously on the first carrier according to the process number indicated in the DCI and corresponding to the initially transmitted data.

At S707, the UE merges the retransmitted data received on the second carrier with the extracted initially transmitted data.

Based on the same inventive concept, the embodiments of the present disclosure further provide a data retransmission apparatus corresponding to the data retransmission method. The principle for solving the problem by the apparatus is similar to the data retransmission method of the embodiments of the present disclosure, so that implementation of the apparatus may refer to implementation of the method, and repeated contents will not be elaborated.

Figure 8:
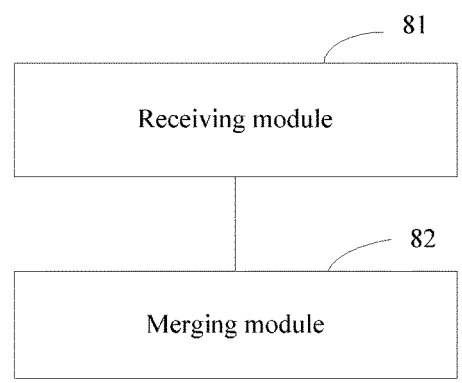
FIG. 8 is a structure diagram of a data retransmission apparatus according to embodiment 1 of the present disclosure.

FIG. 8 is a structure diagram of a data retransmission apparatus according to embodiment 1 of the present disclosure. The apparatus includes:

a receiving module 81, configured to receive retransmitted data transmitted to UE by a base station on a second carrier, the retransmitted data being data failed to be transmitted previously on a first carrier; and a merging module 82, configured to merge the received retransmitted data with initially transmitted data received previously on the first carrier and corresponding to the retransmitted data.

Optionally, the first carrier is located in an unlicensed band; and the second carrier is located in the unlicensed band or a licensed band.

Optionally, the receiving module 81 is further configured to, before receiving the retransmitted data transmitted on the second carrier, receive DCI transmitted on the second carrier, the DCI being configured to indicate the UE to receive downlink data transmitted on the second carrier as the retransmitted data and merge the received downlink data with the initially transmitted data corresponding to the retransmitted data.

Optionally, the DCI includes:
first information indicating the first carrier on which the initially transmitted data is transmitted; and/or
second information indicating a process number corresponding to the initially transmitted data.

Optionally, the first information includes a CIF indicating the first carrier and a 1 bit flag configured to indicate that the carrier indicated by the CIF is the carrier on which the initially transmitted data is transmitted.

Optionally, the receiving module 81 is further configured to, before receiving the retransmitted data transmitted on the second carrier, after it is determined that the data is failed to be received on the first carrier, determine the second carrier for data retransmission and a process number corresponding to the retransmitted data according to a retransmission carrier selection principle and a process number selection principle; and when the downlink data is required to be received, if it is determined that a carrier on which the downlink data is transmitted is the second carrier determined previously for data retransmission and a process number corresponding to the downlink data is the process number corresponding to the retransmitted data determined previously, determine that the downlink data required to be received is the retransmitted data.

Optionally, the retransmission carrier selection principle includes that: a carrier with a minimum load and a best channel condition is selected from carriers participating in CA as the second carrier.

Optionally, the process number selection principle includes that:

a value obtained by a modulo operation of the process number corresponding to the initially transmitted data over a number of processes carried by the second carrier is determined;

if the value obtained by the modulo operation is not 0, the process number corresponding to the retransmitted data is selected to be the value obtained by the modulo operation; and if the value obtained by the modulo operation is 0, the process number corresponding to the retransmitted data is selected to be a value of the number of the processes carried by the second carrier, or, the process number corresponding to the retransmitted data is selected to be a preset process number.

Optionally, when the second carrier is an FDD carrier, the number of the processes carried by the second carrier is 8; and when the second carrier is a TDD carrier, the number of the processes carried by the second carrier is a number of processes carried by the second carrier under a current uplink and downlink sub-frame proportion.

Figure 9:
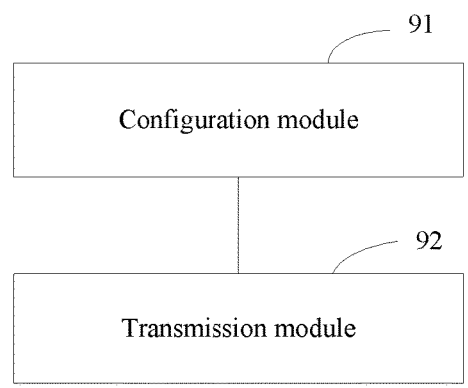
FIG. 9 is a structure diagram of a data retransmission apparatus according to embodiment 2 of the present disclosure.

FIG. 9 is a structure diagram of a data retransmission apparatus according to embodiment 2 of the present disclosure. The apparatus includes:

a configuration module 91, configured to, when data is failed to be transmitted to UE on a first carrier, if it is determined that the first carrier may not be continued to be used for data retransmission, configure a second carrier for data retransmission for the UE; and a transmission module 92, configured to retransmit the data failed to be transmitted previously on the first carrier to the UE on the second carrier configured by the configuration module 91.

Optionally, the first carrier is located in an unlicensed band; and the second carrier is located in the unlicensed band or a licensed band.

Optionally, the configuration module 91 is specifically configured to:

if a carrier configurable for data retransmission in the unlicensed band is found within a preset time length or the number of traversing times, determine the found carrier in the unlicensed band as a second carrier for data retransmission, otherwise, determine a carrier in the licensed band as the second carrier.

Optionally, the transmission module 92 is further configured to, before retransmitting the data failed to be transmitted previously on the first carrier to the UE on the configured second carrier, transmit DCI to the UE on the second carrier, the DCI being configured to indicate the UE to receive downlink data transmitted on the second carrier and merge the received downlink data with initially transmitted data corresponding to the retransmitted data as the retransmitted data.

Optionally, the DCI includes:
first information indicating the first carrier on which the initially transmitted data is transmitted; and/or
second information indicating a process number corresponding to the initially transmitted data.

Optionally, the first information includes a CIF indicating the first carrier and a 1 bit flag configured to indicate that the carrier indicated by the CIF is the carrier on which the initially transmitted data is transmitted.

Those skilled in the art should know that the embodiment of the present disclosure may be provided as a method, a system or a computer program product. Therefore, the present disclosure may adopt a form of pure hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Although the preferred embodiments of the present disclosure have been described, those skilled in the art may make additional variations and modifications to these embodiments once learning about the basic creative concept. Therefore, the appended claims are intended to be explained to include the preferred embodiments and all variations and modifications falling within the scope of the present disclosure.

Obviously, those skilled in the art may make various modifications and transformations to the present disclosure without departing from the spirit and scope of the present disclosure. Then, if these modifications and transformations of the present disclosure fall within the scope of the claims of the present disclosure and an equivalent technology thereof, the present disclosure is also intended to include these modifications and transformations.

The invention claimed is:

1. A data retransmission method, comprising:
   receiving Downlink Control Information (DCI) transmitted on a second carrier, the DCI being configured to indicate User Equipment (UE) to receive downlink data transmitted on the second carrier and merge the received downlink data with initially transmitted data corresponding to retransmitted data as the retransmitted data;
   receiving the retransmitted data transmitted to the UE on the second carrier, the retransmitted data being data failed to be transmitted previously on a first carrier; and
   merging the received retransmitted data with the initially transmitted data received previously on the first carrier and corresponding to the retransmitted data.

2. The method according to claim 1, wherein the DCI comprises at least one of:
   first information indicating the first carrier on which the initially transmitted data is transmitted; and
   second information indicating a process number corresponding to the initially transmitted data,
   wherein the first information comprises a Carrier Instructions Field (CIF) indicating the first carrier and 1 bit flag configured to indicate that the carrier indicated by the CIF is the carrier on which the initially transmitted data is transmitted.

3. The method according to claim 1, before receiving the retransmitted data transmitted on the second carrier, further comprising:
   after it is determined that the data is failed to be received on the first carrier, determining the second carrier for data retransmission and a process number corresponding to the retransmitted data according to a retransmission carrier selection principle and a process number selection principle; and
   when the downlink data is required to be received, if it is determined that a carrier on which the downlink data is transmitted is the second carrier determined previously for data retransmission and a process number corresponding to the downlink data is the process number corresponding to the retransmitted data determined previously, determining that the downlink data required to be received is the retransmitted data.

4. The method according to claim 3, wherein the retransmission carrier selection principle comprises: selecting a carrier with a minimum load and a best channel condition from carriers participating in Carrier Aggregation (CA) as the second carrier.

5. The method according to claim 3, wherein the process number selection principle comprises:
   determining a value obtained by a modulo operation of the process number corresponding to the initially transmitted data over a number of processes carried by the second carrier;
   if the value obtained by the modulo operation is not 0, selecting the process number corresponding to the retransmitted data to be the value obtained by the modulo operation; and
   if the value obtained by the modulo operation is 0, selecting the process number corresponding to the retransmitted data to be a value of the number of the processes carried by the second carrier, or, selecting the process number corresponding to the retransmitted data to be a preset process number.

6. A data retransmission method, comprising:
   transmitting Downlink Control Information (DCI) to User Equipment (UE) on a second carrier, the DCI being configured to indicate (UE) to receive downlink data transmitted on the second carrier and merge the received downlink data with initially transmitted data corresponding to retransmitted data as the retransmitted data;

when data is failed to be transmitted to the UE on a first carrier, if it is determined that the first carrier may not be continued to be used for data retransmission, configuring the second carrier for data retransmission for the UE; and retransmitting the data failed to be transmitted previously on the first carrier to the UE on the configured second carrier.

7. The method according to claim 6, wherein configuring the second carrier for data retransmission for the UE comprises:

if a carrier configurable for data retransmission in the unlicensed band is found within a preset time length or number of traversing times, determining the found carrier in the unlicensed band as a second carrier for data retransmission, otherwise, determining a carrier in the licensed band as the second carrier.

8. The method according to claim 6, wherein the DCI comprises at least one of:

first information indicating the first carrier on which the initially transmitted data is transmitted; and second information indicating a process number corresponding to the initially transmitted data, wherein the first information comprises a Carrier Instructions Field (CIF) indicating the first carrier and a 1 bit flag configured to indicate that the carrier indicated by the CIF is the carrier on which the initially transmitted data is transmitted.

9. A data retransmission apparatus, the apparatus comprises a memory storing computer-executable instructions; and one or more processors executing the computer-executable instructions to implement a plurality of program units, where the plurality of program units comprises:

a receiving module, configured to receive Downlink Control Information (DCI) transmitted on a second carrier, the DCI being configured to indicate User Equipment (UE) to receive downlink data transmitted on the second carrier and merge the received downlink data with initially transmitted data corresponding to retransmitted data as the retransmitted data;

the receiving module is further configured to receive retransmitted data transmitted to the UE by a base station on the second carrier, the retransmitted data being data failed to be transmitted previously on a carrier; and a merge module, configured to merge the receive retransmitted data transmitted with initially transmitted data received previously on the first carrier and corresponding to the retransmitted data.

10. The apparatus according to claim 9, wherein the DCI comprises at least one of:

first information indicating the first carrier on which the initially transmitted data is transmitted; and second information indicating a process number corresponding to the initially transmitted data, wherein the first information comprises a Carrier Instructions Field (CIF) indicating the first carrier and a 1 bit flag configured to indicate that the carrier indicated by the CIF is the carrier on which the initially transmitted data is transmitted.

11. The apparatus according to claim 9, wherein the receiving module is further configured to, before receiving the retransmitted data transmitted on the second carrier, after it is determined that the data is failed to be received on the first carrier, determine the second carrier for data retransmission and a process number corresponding to the retransmitted data according to a retransmission carrier selection principle and a process number selection principle; and when the downlink data is required to be received, if it is determined that a carrier on which the downlink data is transmitted is the second carrier determined previously for data retransmission and a process number corresponding to the downlink data is the process number corresponding to the retransmitted data determined previously, determine that the downlink data required to be received is the retransmitted data.

12. The apparatus according to claim 11, wherein the retransmission carrier selection principle comprises: selecting a carrier with a minimum load and a best channel condition from carriers participating in Carrier Aggregation (CA) as the second carrier.

13. The apparatus according to claim 11, wherein the process number selection principle comprises that:

determining a value obtained by a modulo operation of the process number corresponding to the initially transmitted data over a number of processes carried by the second carrier;

if the value obtained by the modulo operation is not 0, selecting the process number corresponding to the retransmitted data to be the value obtained by the modulo operation; and if the value obtained by the modulo operation is 0, selecting the process number corresponding to the retransmitted data to be a value of the number of the processes carried by the second carrier, or, selecting the process number corresponding to the retransmitted data to be a preset process number.

14. A data retransmission apparatus, the apparatus comprises a memory storing computer-executable instructions; and one or more processors executing the computer-executable instructions to implement a plurality of program unit, where the plurality of program units comprises:

a configuration module, configured to, transmit Downlink Control Information (DCI) to User Equipment (UE) on a second carrier, the DCI being configured to indicate the UE to receive downlink data transmitted on the second carrier and merge the received downlink data with initially transmitted data corresponding to retransmitted data as the retransmitted data;

the configuration module is further configured to, when data is failed to be transmitted to the UE on a first carrier, if it is determined that the first carrier may not be continued to be used for data retransmission, configure the second carrier for data retransmission for the UE; and a transmission module, configured to retransmit the data failed to be transmitted previously on the first carrier to the UE on the second carrier configured by the configuration module.

15. The apparatus according to claim 14, wherein the configuration module is specifically configured to:

if a carrier configurable for data retransmission in the unlicensed band is found within a preset time length or number of traversing times, determine the found carrier in the unlicensed band as a second carrier for data retransmission, otherwise, determine a carrier in the licensed band as the second carrier.

16. The apparatus according to claim 14, wherein the DCI comprises at least one of:

first information indicating the first carrier on which the initially transmitted data is transmitted; and second information indicating a process number corresponding to the initially transmitted data, wherein the first information comprises a Carrier Instructions Field (CIF) indicating the first carrier and a 1 bit flag configured to indicate that the carrier indicated by the CIF is the carrier on which the initially transmitted data is transmitted.

* * * * *